United States Patent Office 3,816,413
Patented June 11, 1974

3,816,413
PROCESS FOR THE PRODUCTION OF HALOGEN-CONTAINING v-TRIAZOLE COMPOUNDS
Rudolf Kirchmayr, Binningen Basel-Land, Switzerland, assignor to Ciba-Geigy Corporation, Ardsley, N.Y.
No Drawing. Filed June 3, 1970, Ser. No. 43,167
Int. Cl. C07d 55/02
U.S. Cl. 260—240 C    4 Claims

ABSTRACT OF THE DISCLOSURE 2,4-substituted-5-halogeno-v-triazoles are produced by reacting a corresponding v-triazole-1-oxide with hydrogen chloride or hydrogen bromide. The v-triazoles are brighteners for high-molecular organic materials.

DESCRIPTION OF INVENTION

The present invention relates to a process for the production of v-triazole compounds containing in the 4- or 5-position of the triazole ring a halogen atom, the compounds produced thereof and the compositions thereof.

v-Triazole compounds containing a halogen atom as substituent on the triazole ring are mentioned in patents as being a possibility, but they have never been distinguished or described in more detail. The reason for this is probably that such compounds are difficultly accessible by known methods of synthesis, and production thereof is expensive since several stages are involved. These compounds are produced, for example, by starting with a triazole compound containing a nitro group in the 4- or 5-position, reducing this nitro group to an amine group, diazotising this and subjecting it to a Sandmeyer's reaction; or by starting with a 1,2,4-oxadiazole of the formula

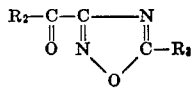

reacting this with a hydrazine of the formula $$H_2\text{—N—NH—}R_1,$$

saponifying the obtained v-triazole compound of the formula

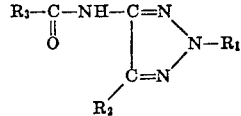

to give the amine, diazotising the amine group and replacing it according to Sandmeyer by a halogen. But it is probable that the desired result is not obtained in all cases by these methods, so that there is a need for a better general production process; for the products obtained constitute important intermediate products for valuable compounds or, if the starting materials are appropriately substituted, the obtained products in themselves constitute valuable final products. In particular, the products exhibit, with the presence of a fluorescent group, a good optical brightening effect. The halogen atom on the v-triazole ring is slow to react, so that when the compounds are used as optical brighteners, e.g. in spinning masses, no disturbing side reactions occur.

Surprisingly, it has now been found that it is possible to obtain, in a simple manner, the desired halogen-containing v-triazoles of the formula I, (I) 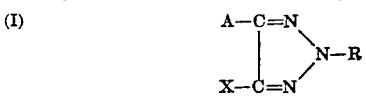

wherein

R represents an organic radical, especially a carbo- or heterocyclic radical, which is bound by means of a carbon atom to the nitrogen atom of the v-triazole ring,
A represents an alkyl, alkenyl, aralkyl, aralkenyl or aryl group, or a heterocyclic radical of aromatic character, and
X represents chlorine or bromine, by reacting a v-triazole oxide of the formula II (II), 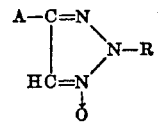

with hydrogen chloride or hydrogen bromide.

Preferred are compounds of the formula I wherein R is unsubstituted phenyl or phenyl substituted by alkoxy having 1 to 4 carbon atoms for example methoxy, ethoxy, propoxy or butoxy, or substituted by halogen such as chlorine or bromine or substituted by alkyl having 1 to 4 carbon atoms such as methyl, ethyl, propyl, butyl, sec.butyl; or R is naphthyl, coumarinyl, 3-phenyl-coumarinyl or stilbyl, which is unsubstituted or substituted by a v-triazolyl group having as substituents A and X as defined in formula I. In the preferred compounds A has the meaning of alkyl having 1 to 4 carbon atoms such as methyl, ethyl, propyl or butyl, alkenyl having 2 to 4 carbon atoms such as ethenyl, propenyl or butenyl, aralkyl having 7 or 8 carbon atoms such as benzyl or phenylethyl, aralkenyl having 8 to 10 carbon atoms such as phenylethenyl or phenylpropenyl, unsubstituted phenyl, a phenyl substituted by alkoxy having 1 to 4 carbon atoms such as methoxy, ethoxy, propoxy or butoxy, or substituted by halogen such as chlorine or bromine or substituted by alkyl having 1 to 4 carbon atoms such as methyl, ethyl, propyl or butyl, or A is naphthyl or thienyl and X is chlorine and bromine.

For producing chlorine-containing compounds, it is best to use gaseous hydrogen chloride. This is advantageously passed through a mixture of water and a water-soluble solvent such as dioxane or diethylene glycol dimethyl ether, in which the v-triazole oxide is contained, and the reaction is performed at reflux temperature, i.e. in general at temperatures between 80 and 120° C., and for several hours.

The starting materials for the process according to the invention, the v-triazole-1-oxides, can be obtained from compounds of the formula IIa (IIa) 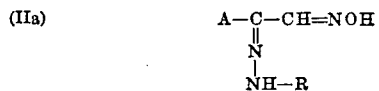

by oxidative ring closure.

Oxidative ring closure can be effected by the action of the various oxidising agents; it is thereby advisable to operate in solvents which are resistant to oxidation. In acid, e.g. acetic acid solution, bichromate or hydrogen peroxide are suitable oxidising agents; in basic solvents such as pyridine or pyridine/water mixtures, potassium ferric cyanide is, for example, suitable. The generally applicable and therefore preferred process consists in oxidation with copper-(II)-sulphate in pyridine/water. It is not necessary to thereby use stoichiometric amounts of copper because the monovalent copper forming during the reaction can be continuously reconverted during the reaction, by the blowing in of air or oxygen, into the bivalent stage.

The compounds of the formula IIa can be produced by reaction of compounds of the formula $$A\text{—CO—CH=NOH}$$

with R—NH—NH$_2$.

Particularly interesting compounds which can be obtained by the new process are those with a fluorescent group, which can therefore be used as optical brighteners. Suitable as fluorescent groups are, in particular, substituted coumarinyl or stilbyl groups.

Optical brighteners of the formula I, wherein X denotes chlorine and R denotes a coumarinyl group of the formula III,

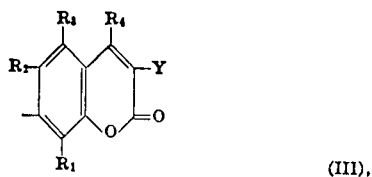

(III), wherein

Y represents a mononuclear carbo- or heterocyclic aryl group in conjugation with the coumarin ring, and $R_1$, $R_2$, $R_3$ and $R_4$ represent hydrogen or a lower alkyl group, are obtained by reaction of the corresponding substituted v-triazole oxide of the formula II with hydrogen chloride. Lower alkyl groups are such alkyl groups containing 1–6, especially 1–4 carbon atoms.

Produced in the same manner are optical brighteners of the formula I, wherein X denotes chlorine and R denotes a stilbyl group of formula IV,

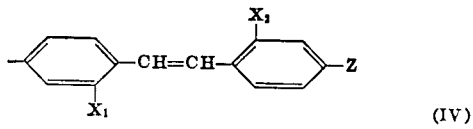

(IV)

wherein $X_1$ and $X_2$ stand for hydrogen, the sulphonic acid radical, carboxylic acid radical or sulphonamide radical, a sulphonic ester radical, a carboxamide radical, a carboxy ester radical, an alkylsulphonic radical or arylsulphonic radical, or the cyano group, and Z stands for hydrogen, halogen, the cyano group, an acylated amino group or an optionally substituted v-triazolyl group, the substituents thereof can be defined as in formula I A and X, pyrazolyl group or triazinyl group.

Preferred compounds of the formula IV are the compounds of the formula IVa

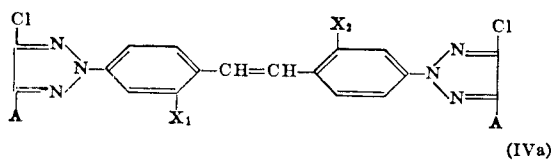

(IVa)

wherein A has the meaning as defined under formula I and $X_1$ and $X_2$ stand for hydrogen, the sulphonic acid radical, the carboxylic acid radical, the unsubstituted sulphon amide radical, a substituted sulphon amide radical having 1 to 4 carbon atoms such as the methyl, dimethyl, ethyl, diethyl, propyl or butyl derivatives of the sulphon amide, an aromatic sulphon ester radical having 6 to 8 carbon atoms such as the phenyl ester, the unsubstituted carbamide radical, a substituted carbamide radical having 2 to 5 carbon atoms such as a carbamide radical substituted by methyl, dimethyl, ethyl, diethyl, propyl or butyl; an aliphatic or aromatic carboxylic ester radical having 2 to 11 carbon atoms such as carbmethoxy, carbethoxy, carbpropoxy, carbbutoxy, carbphenoxy; an alkylsulphonyl radical having 1 to 4 carbon atoms such as the methylsulphonyl, ethylsulphonyl, propylsulphonyl or butylsulphonyl radical; the phenylsulphonyl radical or the cyano group.

These coumarin and stilbene derivatives, which are distinguished by good compatibility with high-molecular, hydrophobic organic substances, are suitable for the brightening of such materials which can be produced, e.g. by polymerisation or polycondensation, such as polyolefins, e.g. polyethylene or polypropylene, also polyvinyl chloride, but especially polyesters, particularly polyesters of aromatic polycarboxylic acids with polyvalent alcohols such as polyterephthalic acid glycol ester, synthetic polyamides such as Nylon-6- and Nylon-66, but also cellulose esters such as cellulose acetate.

Optical brightening of high-molecular, hydrophobic, colourless, organic material is carried out, e.g. by incorporating into the material small amounts of optical brighteners obtained according to the invention, preferably 0.001 to 1% relative to the material to be brightened, optionally together with other substances such as softeners, stabilisers or pigments. The brighteners can be worked into the synthetic materials, e.g. dissolved in softeners such as dioctylphthalate, or together with stabilisers such as dibutyl tin dilaurate or sodium pentaoctyltripolyphosphate, or together with pigments such as, e.g. titanium dioxide. Depending on the type of material to be brightened, the brightener can also be dissolved in the monomers before polymerisation, in the polymer mass, or together with the polymers in a solvent. The thus preliminary treated material is then brought into the desired ultimate form by methods known per se, such as calendering, pressing, extrusion coating, moulding, and in particular spinning and stretching. The brighteners can also be worked into finishings e.g. into finishings for textile fibres such as polyvinyl alcohol, or into resins or resin condensates such as, e.g. methylol compounds of ethylene urea, which are used for the treatment of textiles.

Colourless, high molecular, organic material is likewise brightened in the form of fibres. For the brightening of these fibre materials, an aqueous dispersion or solution of v-triazoles of formula I according to the invention is advantageously used. The brightener preparation preferably contains, relative to the fibre material, 0.005–0.5% of v-triazole according to the invention. In addition, the dispersion can contain auxiliaries such as dispersing agents, e.g. condensation products of fatty alcohols or alkylphenols containing 10 to 18 carbon atoms with 15 to 25 moles of ethylene oxide, or condensation products of alkylmono or polyamines containing 16 to 18 carbon atoms with at least 10 moles of ethylene oxide, organic acids such as formic, oxalic or acetic acid, detergents, swelling agents such as di- or trichlorobenzenes, wetting agents such as sulphosuccinic acid alkyl ester, bleaching agents such as sodium chlorite, peroxides or hydrosulphites, as well as, optionally, brightening agents of other classes such as, e.g. derivatives of stilbene having affinity to cellulose.

The brightening of the fibre material with the aqueous brightener preparation is performed either in the exhaust process, at temperatures of preferably 30 to 150° C., or in the padding process. In this case, the material is impregnated with an, e.g. 0.2–0.5% brightener dispersion, and is finished, e.g. by dry or moist heat treatment, e.g. by steaming at 2 atm. or, after drying has been performed, by a short, dry heating to 180–220°, whereby the fabric is optionally simultaneously thermofixed. Fibre material treated in this manner is finally rinsed and dried.

Colourless, high-molecular, organic material optically brightened in the described manner, especially the synthetic fibre material brightened by the exhaust process, has a pleasing, pure white, blue-violet to bluish fluorescent appearance; such material dyed in light shades and brightened according to the invention is distinguished by a pure shade.

The v-triazoles obtained according to the invention can also be added to detergents. Such detergents containing v-triazoles can also be used for the brightening of textiles. They can contain the usual fillers and auxiliaries, e.g. alkali-poly- and -polymetaphosphates, alkali silicates, alkali borates, alkali salts of carboxymethyl celluloses, foam stabilisers such as alkanolamides, higher fatty acids, or complexones such as soluble salts of ethylenediaminetetraacetic acid, as well as chemical bleaching agents such as perborates or percarbonates.

The new v-triazoles are incorporated, into the detergents or into washing liquors, advantageously in the form of their solutions in neutral, water-miscible and/or easily volatile organic solvents such as lower alkanols, lower alkoxyalkanols or lower aliphatic ketones. They can also be used, however, in a finely dispersed, solid form, on their own or in admixture with dispersing agents. They can, for example, be mixed, kneaded or milled with the wash-active substances, and then the usual auxiliaries and fillers mixed in. The brightening agents are stirred, for example, with the wash-active substances, the usual auxiliaries and fillers, and water to form a suspension, and this is then sprayed in the spray dryer. The new v-triazole derivatives may also be added to finished detergents, e.g. by spraying a solution in an easily volatile and/or water-soluble, organic solvent onto the dry detergents as they are kept in motion.

The content in the detergents of the optical brightener, relative to the solid content in the detergent, is advantageously 0.001–0.5%. Detergents containing such optical brighteners can have, compared with detergents containing no brighteners, a greatly improved white appearance by daylight.

Washing liquors containing optical brighteners produced according to the invention impart during washing to the textile fibres treated therewith, e.g. synthetic polyamide, polyester, polyolefin and cellulose ester fibres, a brillant appearance in daylight. They can be used therefore, in particular, for the washing of these synthetic fibres or of textiles or constituent parts of textiles made from such fibres, and for the washing of household linen. For use in domestic washing, they can also contain further optical brighteners having affinity to other fibres, e.g. to cellulose.

The temperatures are given in degrees Centigrade in the following examples.

EXAMPLE 1

1.1. 2-[3-phenylcoumarinyl-(7)]-4-phenyl-5-chloro-v-triazole

Gaseous hydrogen chloride is introduced for 5 hours at reflux temperature into a suspension of 50.0 g. of 2-[3-phenylcoumarinyl-(7)]-4-phenyl-v-triazole - 1 - oxide in a mixture of 1500 ml. of dioxane and 200 ml. of water. After this period of time, no further trace is detectable in the thin-layer chromatogram (solvent: toluene/methanol 8:2) of the starting product, and the formed chlorinated triazole is completely in solution. This solution is evaporated to dryness in a rotary evaporator, and the solid residue, after being washed with water and methanol, is recrystallised from toluene with the use of decolourising carbon. In this manner is obtained, in good yield, 2-[3-phenylcoumarinyl-(7)]-4-phenyl - 5 - chloro-v-triazole as light yellow crystals, M.P. 195–196°, which readily dissolve in chlorobenzene with an intensely blue-violet fluorescence.

If, instead of 2-[3-phenylcoumarinyl-(7)]-4-phenyl-v-triazole-1-oxide, the following triazole oxides are reacted by the above described procedure, then the following v-triazoles are obtained:

From 2-[3-(4-methylphenyl)-coumarinyl-(7)-4-phenyl-v-triazole-1-oxide:

1.2. 2-[3-(4-methylphenyl)-coumarinyl-(7)]-4-phenyl-5-chloro-v-triazole, M.P. 241–242°.

From 2-[3-(3-chlorophenyl)-coumarinyl-(7)]-4-phenyl-v-triazole-1-oxide:

1,3. 2-[3-(3-chlorophenyl)-coumarinyl-(7)]-4-phenyl-5-chloro-v-triazole.

From 2 - [3 - (3 - methoxyphenyl)-coumarinyl-(7)]-4-phenyl-v-triazole-1-oxide:

1.4. 2-[3-(3-methoxyphenyl)-coumarinyl-(7)]-4-phenyl-5-chloro-v-triazole.

From 2-[3-(2-chlorophenyl)-coumarinyl-(7)]-4-phenyl-v-triazole-1-oxide:

1.5. 2-[3-(2-chlorophenyl)-coumarinyl-(7)]-4-phenyl-5-chloro-v-triazole, M.P. 219–220°.

From 2-[3-(4-chlorophenyl)-coumarinyl-(7)]-4-phenyl-v-triazole-1-oxide:

1.6. 2-[3-(4-chlorophenyl)-coumarinyl-(7)-4-phenyl-5-chloro-v-triazole, M.P. 252°.

The brighteners obtained according to this example impart to polyester, polyamide and polypropylene fabrics, with application of the exhaust or padding process, a brilliant white appearance; also when they are added to the monomeric starting compounds for the production of polyesters or to a polyester spinning bath, brilliant white threads are obtained after spinning. With a good degree of success they can also be added to washing baths for textiles, especially polyester and polyamide fibres, and to finishing liquors for fibre mixtures.

The phenylcoumarinyltriazole oxides used in this example and in the Examples 2, 3, 6 and 7 can be produced by the known methods, e.g. by the process described in the Belgian Pat. No. 710,868.

EXAMPLE 2

2.1. 2-[3-phenylcoumarinyl-(7)]-4-methyl-5-chloro-v-triazole 20.0 g. of 2-[3-phenylcoumarinyl-(7)]-4-methyl-v-triazole-1-oxide are suspended in a mixture of 300 ml. of dioxane and 50 ml. of water. Hydrogen chloride is introduced for 4 hours at reflux temperature into this suspension, whereby a crystalline precipitate commences to form after about 2 hours. After completed reaction (the reaction is followed by means of thin-layer chromatography. Solvent: toluene/methanol 8:2), the reaction mixture is cooled, the voluminous crystalline precipitate filtered off under suction, washed with water and methanol and recrystallised, with the use of decolourising carbon, from chlorobenzene. In this manner is obtained in good yield 2-[3-phenylcoumarinyl-(7)-4-methyl-5-chloro-v-triazole in the form of light yellow crystals which dissolved in chlorobenzene with an intensely blue-violet fluorescence, M.P. 249–250°.

If, instead of 2-[3-phenylcoumarinyl-(7)]-4-methyl-v-triazole-1-oxide, 2-[3-phenylcoumarinyl-(7)]-4-n-butyl-v-triazole-1-oxide is reacted, as described above, with hydrogen chloride, then the following is obtained:

2.2. 2-[3-phenylcoumarinyl-(7)]-4-n-butyl-5-chloro-v-triazole.

From 2 - [3 - phenylcoumarinyl - (7)] - 4 - ethyl-v-triazole-1-oxide is obtained:

2.2. 2-[3-phenylcoumarinyl-(7)]-4-ethyl-5-chloro-v-triazole.

From 2-[3-phenylcoumarinyl-(7)]-4-benzyl-v-triazole-1-oxide is obtained:

2.4. 2-[3-phenylcoumarinyl-(7)]-4-benzyl-5-chloro-v-triazole.

These brighteners too are used, in particular, for the brightening of textile material made from polyesters and nylon, using the exhaust or padding process. They can also be added to polyester spinning masses, and can be used too in the production of polyesters.

EXAMPLE 3

3.1. 2-[3-phenylcoumarinyl-(7)]-4-(4-methylphenyl)-5-chloro-v-triazole 7.5 g. of 2 - [3-phenylcoumarinyl-(7)]-4-(4-methylphenyl)-triazole oxide are refluxed in 300 ml. of dioxane and 50 ml. of water. Gaseous hydrogen chloride is fed in for 6 hours at reflux temperature. The obtained dark brown solution is thereupon cooled and evaporated to dryness in a rotary evaporator. The crystalline residue is washed with hot water and methanol and recrystallised from toluene with decolourising carbon black. In this manner is obtained in good yield 2-[3-phenylcoumarinyl-(7)] - 4 - (4 - methylphenyl)-5-chloro-v-triazole in the form of light yellow crystals, M.P. 216–217°.

If, instead of 2-[3-phenylcoumarinyl-(7)]-4-(4-methylphenyl)-triazole-1-oxide, the following triazole oxides are reacted in an analogous manner to that described above, then the following v-triazoles are obtained:

From 2-[3-phenylcoumarinyl-(7)]-4-(4-chlorophenyl)-v-triazole-1-oxide:

3.2. 2-[3-phenylcoumarinyl-(7)]-4-(4-chlorophenyl)-5-chloro-v-triazole, M.P. 229–230°.

From 2 - [3 - phenylcoumarinyl-(7)]-4-(4-methoxyphenyl)-v-triazole-1-oxide:

3.3. 2-[3-phenylcoumarinyl-(7)]-4-(4-methoxyphenyl)-5-chloro-v-triazole, M.P. 197–198°.

From 2 - [3-phenylcoumarinyl-(7)]-4-(2-naphthyl)-4-triazole-1-oxide:

3.4. 2-[3-phenylcoumarinyl-(7)]-4-(2-naphthyl)-5-chloro-v-triazole, M.P. 236–237°.

From 2-[3-phenylcoumarinyl-(7)]-4-(4-phenylphenyl)-v-triazole-1-oxide.

3.5. 2-[3-phenylcoumarinyl-(7)]-4-(4-phenylphenyl)-5-chloro-v-triazole, M.P. 205°.

From 2 - [3 - phenylcoumarinyl-(7)]-4-(3,4-dimethylphenyl)-v-triazole-1-oxide:

3.6. 2-[3-phenylcoumarinyl-(7)]-4-(3,4-dimethylphenyl)-5-chloro-v-triazole.

From 2 - [3 - phenylcoumarinyl-(7)]-4-[thienyl-(2)]-v-triazole-1-oxide:

3.7. 2-[3-phenylcoumarinyl-(7)]-4-[thienyl-(2)]-5-chloro-v-triazole.

These compounds are used for the optical brightening of various textile fibres, particularly those made from polyesters, polyamides or polypropylene. The compounds may be applied to the textile material by means of the exhaust process or the padding process. They can moreover be contained in a detergent for textile fibres. Also their addition to a spinning mass of polyester or polypropylene leads to greatly brightened fibres.

EXAMPLE 4

28.2 g. of bis-(oximinoacetophenone)-stilbenehydrazone-disulphonic acid are dissolved hot in 250 ml. of pyridine and 50 ml. of water. Into this solution are added dropwise at boiling temperature, during the course of 30 minutes, a solution of 40.0 g. of copper sulphate in 250 ml. of water; and stirring then proceeds for 4 hours at the refluxing temperature. The reaction mixture is then adjusted with 40 ml. of concentrated sodium hydroxide solution to a pH-value of 8–10 and the pyridine expelled with steam. The residue is cooled, filtered off and recrystallised from aqueous alcohol. In this manner is obtained the triazole oxide of the formula:

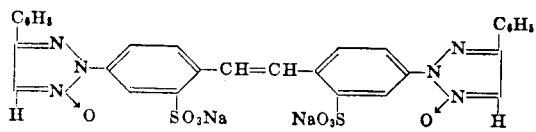

as a yellow powder.

24.0 g. of this triazole oxide in 1500 ml. of dioxane and 200 ml. of water are brought to reflux temperature. Whilst stirring is performed, gaseous hydrogen chloride is introduced during 6 hours into the boiling hot suspension. The reaction mixture is thereupon concentrated in vacuo to a third of the volume. The residue is filtered off, dissolved in water and the aqueous solution adjusted with concentrated sodium hydroxide solution to a pH-value of 8–10. The precipitating sodium salt of 4,4'-bis-[4-phenyl-5-chlorotriazolyl-(2)] - stilbene - 2,2' - disulphonic acid is purified by dissolving and crystallising from 50% aqueous ethanol. In this manner is obtained in good yield the chlorotriazole of the formula:

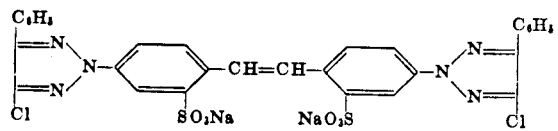

as a light yellow powder.

The compound is able to intensively brighten, e.g. cotton or polyamide fibres, whereby the compound can be applied to the fibre using the exhaust process, e.g. in a washing bath or a bleaching liquor.

EXAMPLE 5

30.0 g. of bis-(oximinoacetone)-stilbenehydrazone-disulphonic acid are dissolved hot in 200 ml. of pyridine and 50 ml. of water. Into this solution is added dropwise at boiling temperature, during the course of 30 minutes, a solution of 45.0 g. of copper sulphate in 250 ml. of water; stirring then proceeds for 4 hours at the reflux temperature. The reaction mixture is adjusted with concentrated sodium hydroxide solution to a pH-value of 8–10, whereupon the pyridine is expelled with steam. The residue is filtered off and recrystallised from aqueous alcohol. By this means is obtained as a yellow powder the triazole oxide of the formula:

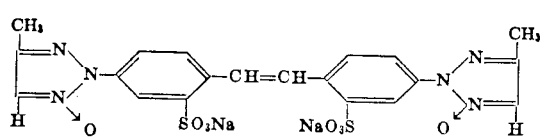

16.0 g. of the above triazole oxide in 1200 ml. of dioxane and 150 ml. of water are brought to reflux temperature. Gaseous hydrogen chloride is fed into this reaction mixture for 6 hours at the reflux temperature. The reaction mixture is thereupon evaporated to dryness. The residue is dissolved in water, filtered, and in the filtrate is precipitated, with concentrated sodium chloride solution, the sodium salt of 4,4'-bis-[4-methyl-5-chloro-v-triazolyl-(2)]-stilbene-2,2'-disulphonic acid, which is purified by dissolving and crystallising from 50% aqueous ethanol. By this means is obtained in good yield, as light yellow powder, the chlorotriazole of the formula:

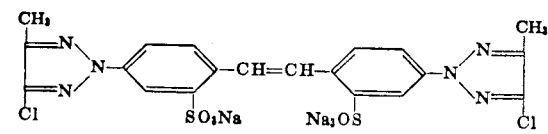

The compound imparts to textile material made from cotton or polyamides such as nylon, from one bath, e.g. a washing bath, a pure white appearance.

EXAMPLE 6

2-[3-phenylcoumarinyl-(7)]-4-phenyl-5-bromo-v-triazole 300 ml. of 50% hydrobromic acid are added dropwise at the reflux temperature to a suspension of 25.0 g. of 2-[3 - phenylcoumarinyl-(7)]-4-phenyl-v-triazole-1-oxide in a mixture of 1000 ml. of dioxane and 100 ml. of water. On cooling, a crystalline precipitate is formed, and from this is isolated, by recrystallization from chlorobenzene and by means of column chromatography, 2-[3-phenylcoumarinyl-(7)]-4-phenyl-5-bromo-v-triazole.

The compound is able to brighten, by the usual application processes, various textile materials such as polyester, polyamide or polypropylene fibres.

EXAMPLE 7

2-(2-methoxy-5-chlorophenyl)-4-phenyl-5-chloro-v-triazole 30.2 g. of 2-(2-methoxy-5-chlorophenyl)-4-phenyl-v-triazole-1-oxide are dissolved in a mixture of 100 ml. of dioxane and 20 ml. of water. Hydrogen chloride is passed into this solution for 6 hours at the reflux temperature. The reaction mixture is then evaporated to dryness, and the residue recrystallised from alcohol. The thus obtained 2-(2 - methoxy - 5 - chlorophenyl)-4-phenyl-5-chloro-v-triazole melts at 81°.

EXAMPLE 8

To 100 ml. of water are added as carrier 0.2 g. of trichlorobenzene, and a solution of 0.003 g. of the triazole derivative described in Example 1.1. in 3 ml. of ethylene glycol monomethyl ether is added. The thus obtained liquor is heated to 60° and into it are then placed 3 g. of a polyester fabric. The temperature is raised within 10–15 minutes to 95–98° and this temperature is maintained for one hour. The fabric is thereupon rinsed and dried. The thus treated fabric possesses a white, brilliant appearance.

Similar results are obtained by proceeding as described in the above example but using, instead of the brightener stated there, the v-triazoles described in the Examples 2.1, 3.2, 3.1, 3.3, 3.4 and 3.5.

In this example and in the following Examples 9, 10 and 25, "trichlorobenzene as carrier" signifies a mixture consisting of 76 parts by weight of 1,2,4-trichlorobenzene and 27 parts by weight of a mixture suitable as an emulsifier for the production of aqueous emulsions.

EXAMPLE 9

To 100 ml. of water are added 0.2 g. of sodium chlorite, 0.2 g. of sodium nitrate and 0.2 g. of oxalic acid and 3 ml. of a stock solution of the brightener produced in Example 2.1. The stock solution is prepared by dissolving 1 g. of the stated brightener in 1000 ml. of ethylene glycol monomethyl ether. To this aqueous solution are additionally added, as a carrier, 0.2 g. of trichlorobenzene. This liquor is heated to 60°; then 3 g. of a polyester fabric are introduced into the liquor, the temperature is raised in the course of 10–15 minutes to 85°, and the bath is allowed to stand for 30 minutes at this temperature. The temperature is subsequently raised to 98–100° and, at this temperature, the polyester fabric is treated for a further 30 minutes. The fabric is then rinsed and dried. The thus treated fabric has a white, brilliant appearance.

A clearly brightened fabric is likewise obtained by proceeding as described in this example but using, instead of the stated brightener, the chlorinated triazoles according to Examples 1.1, 3.1, 3.5.

EXAMPLE 10

To 285 ml. of water are added 0.3 g. of alkylpolyglycol ether and 0.15 g. of trichlorobenzene as a carrier. A solution is prepared of the optical brightener according to Example 3.1 by dissolving 1 g. thereof in 1000 ml. of ethylene glycol monoethyl ether.

15 ml. of this stock solution are added to the above described solution. The liquor is heated to 20–30°, and 15 g. of polyester fabric are introduced into the solution. The temperature is raised within 30 minutes to 130° and this temperature is maintained for 30 minutes. The whole is then cooled in the course of 15–20 minutes to 60°. The fabric is rinsed and dried and afterwards thermofixed for 30 seconds at 200° with hot air. The thus treated fabric has a white, brilliant appearance.

Similar results are obtained by proceeding as described above but using the brighteners given in Examples 2.1, 1.1, 3.2, 3.3, 3.4 and 3.5.

EXAMPLE 11

To 100 ml. of water are added 0.2 g. of di-n-octyl sodium sulphosuccinate. A 10% sand milling is produced of the optical brightener according to Example 1.1. 3 g. of this sand milling are added to the above described aqueous solution. A polyester fabric is padded with this solution (20°) (squeezing effect 50–60%, roller pressure 30 kg./cm.$^2$, speed 3 m./minute). The fabric is dried at ca. 60°, and the dried fabric fixed for 30 seconds at 200°. The thus treated fabric possesses a white, brilliant appearance.

Similar results are obtained with the brighteners according to Examples 2.1, 3.2, 3.1, 3.3, 3.4 and 3.5.

EXAMPLE 12

To 100 ml. of water are added 0.4 g. of the detergent of the following composition:

| | Percent |
|---|---|
| Dodecylbenzene sulphonate | 16 |
| Fatty alcohol sulphonate | 4 |
| Na-tripolyphosphate | 35 |
| Tetra sodium phosphate | 7 |
| Magnesium silicate | 2 |
| Sodium disilicate | 7 |
| Carboxymethyl cellulose | 1 |
| Sodium sulphate | 25.5 |
| Water | 2.5 |

1.0 g. of the optical brightener obtainable according to Example 1.1 is dissolved in 1000 ml. of ethylene glycol monomethyl ether. 0.8 ml. of this stock solution are added to the above described aqueous solution. The thus obtained washing liquor is heated to 55–60° and 3 g. of a polyester fabric are introduced. Washing proceeds at this temperature for 20 minutes. The fabric is rinsed and dried. The washed sections of fabric possess after the treatment a brilliant, white appearance. Similar results are obtained by proceeding as described above but using, instead of the above brightener, the brightener described in Example 3.5.

EXAMPLE 13

To 100 ml. of water are added 0.06 g. of an alkylpolyglycol ether. A solution is prepared of the optical brightener according to Example 2.1 by dissolving 1.0 g. thereof in 1000 ml. of dimethylformamide. 1.5 ml. of this stock solution are added to the above described aqueous solution. This liquor is heated to 60°, and 3 g. of nylon staple fabric are then introduced into this solution. The temperature is raised within 10–15 minutes to 90–92° and this temperature is maintained for 30 minutes. The fabric is rinsed and dried. The thus treated fabric has a white and brilliant appearance.

Similar results are obtained with the brighteners according to Examples 1.1, 3.1, 3.2, 3.4, 3.5, 4 and 5, using the same method of application.

EXAMPLE 14

To 100 ml. of water are added 0.12 ml. of 85% formic acid and 0.06 g. of an alkylpolyglycol ether. A solution is prepared of the optical brightener according to Example 3.1 by dissolving 1 g. thereof in 100 ml. of dimethylformamide. 1.5 ml. of the stock solution are added to the above described aqueous solution. This aqueous solution containing the brightener is heated to 60°, and 3 g. of nylon staple fabric are introduced into this liquor. The temperature is raised within 10 minutes to 90–92° and this temperature is maintained for 30 minutes. The fabric is then rinsed and dried. The thus treated fabric possesses a white and brilliant appearance.

Similar results are obtained, using the same method of application as given above, with the brighteners described in Examples 2.1, 1.1, 3.2, 3.3, 3.4, 3.5, 4 and 5.

EXAMPLE 15

To 100 ml. of water are added 0.4 g. of detergent as in Example 12. A solution is prepared of the optical brightener according to Example 1.1 by dissolving 1 g. thereof in 1000 ml. of ethylene glycol monomethyl ether. 1 ml. of this stock solution is added to the above described liquor. This is then heated to 60° and 3 g. of polyamide fabric are introduced into the solution. This temperature is maintained for 20 minutes. After being rinsed and dried, the fabric has a brilliant white appearance.

Similar results are obtained with the same procedure but using the brighteners described in Examples 3.1, 3.3, 3.7, 4 and 5.

EXAMPLE 16

To 100 ml. of water are added 0.6 ml. of 8% acetic acid and 0.06 g. of alkylpolyglycol ether. A solution is prepared of the optical brightener according to Example 1.1 by dissolving 1 g. thereof in 1000 ml. of dimethylformamide. 6 ml. of this stock solution are added to the above described aqueous solution. This liquor is heated to 40°, and 3 g. of polypropylene fabric ("Meraklon") are introduced into this solution. The temperature is raised within 10–15 minutes to 95–98° and this temperature is maintained for 30 minutes. The fabric is rinsed and dried.

The thus treated fabric has a white and brilliant appearance.

EXAMPLE 17

To 100 ml. of water are added 0.6 ml. of 8% acetic acid and 0.06 g. of alkylpolyglycol ether. A solution is prepared of the optical brightener according to Example 3.7 by dissolving 1 g. thereof in 1000 ml. of dimethylformamide. 6 ml. of this stock solution are added to the above described aqueous solution. This solution containing the optical brightener is heated to 60°, and 3 g. of triacetate twill fabric are then introduced into the solution. The temperature is raised within 10–15 minutes to 95–98° and this temperature is maintained for 30 minutes. The fabric is rinsed and dried. The thus treated fabric possesses a brilliant white appearance.

EXAMPLE 18

To 100 ml. of water are added 0.6 ml. of 8% acetic acid and 0.06 g. of alkylpolyglycol ether. A solution is prepared of this optical brightener according to Example 3.7 by dissolving 1 g. thereof in 1000 dimethylformamide. 6 ml. of this stock solution are added to the above described aqueous solution. This aqueous solution containing the brightener is heated to 40°, and 3 g. of acetate satin fabric are then introduced into the solution. The temperature is raised within 10–15 minutes to 75° and this temperature is maintained for 30 minutes. The fabric is rinsed and dried. The thus treated fabric possesses a brilliant white appearance.

EXAMPLE 19

To 100 ml. of water are added 0.2 g. of sodium sulphate and 0.06 g. of alkylpolyglycol ether. 1 g. of the optical brightener according to Example 4 is dissolved in 1000 ml. of water. 2 ml. of this stock solution are added to the above described solution. This aqueous solution containing the brightener is heated to 40–45°, and 3 g. of cotton fabric are then introduced into the solution. This temperature is maintained for 30 minutes. The fabric is thereupon rinsed and dried.

The thus treated fabric possesses a white, brilliant appearance.

Similar results are obtained with the brightener according to Example 5, using the same method of application.

EXAMPLE 20

To 100 ml. of water are added 0.4 g. of detergent of the same composition as described in Example 12. (Instead of sodium sulphate, the detergent can also contain 10–20% of Na-perborate or another agent releasing oxygen.)

A solution is prepared of the opitcal brightener according to Example 5 by dissolving 1 g. of thereof in 1000 ml. of water. 2 ml. of this stock solution are added to the above described liquor. This aqueous solution containing the brightener is heated to 92° and 3 g. of cotton fabric are introduced into the solution. This temperature is maintained for 30 minutes; the fabric is then rinsed and dried. The thus treated fabric possesses a white brilliant appearance.

With the same application as described above, similar results are obtained using the brightener according to Example 4.

EXAMPLE 21

To 100 ml. of water are added 0.2 g. of Na-chlorite, 0.2 g. of Na-nitrate and 0.2 g. of oxalic acid, or an equivalent amount of another organic or inorganic acid suitable for this purpose.

A solution is prepared of the optical brightener described in Example 4 by dissolving 1 g. thereof in 1000 ml. of water. 2 ml. of this stock solution are added to the above described solution. This aqeuous solution containing the brightener is heated to 40°, and 3 g. of desized, unbleached cotton fabric are introduced into the solution. The temperature is raised within 15–20 minutes to 85° and this temperature is maintained for 60 minutes. The fabric is rinsed and dried.

The thus treated fabric has a white brilliant appearance.

EXAMPLE 22

To 100 ml. of water are added 0.1 g. of Na-chlorite, 0.1 g. of Na-nitrate and 0.1 g. of oxalic acid, or an equivalent amount of another organic or inorganic acid suitable for this purpose. A solution is prepared of the optical brightener according to Example 4 by dissolving 1 g. thereof in 1000 ml. of water free from salt. 2 ml. of this stock solution are added to the above described solution. This aqueous solution containing the brightener is heated to 40°, and 3 g. of polyamide fabric are introduced into the solution. The temperature is raised within 15–20 minutes to 85°, and this temperature is maintained for 60 minutes. The fabric is rinsed and dried. The thus treated fabric possesses a white brilliant appearance.

EXAMPLE 23

An aqueous solution of the following composition is prepared:

150 g./l. of a reactant resin based on dimethylol-ethylene resin,
15 g./l. of $MgCl_2 \cdot 6H_2O$,
20 g./l. of a 10% aqueous dispersion of the brightener described in Example 1.1,
1 g./l. of the brightener of the formula

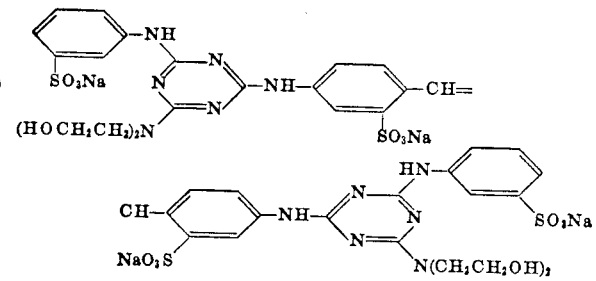

This solution is made up to 1000 ml. with water. A cotton/polyester mixed fabric is padded with this solution (squeezing effect 50–60%), preliminary dried at 100° and subsequently condensed for 5 minutes at 140°. The fabric is afterwards washed with a soda-alkaline washing solution. The thus treated fabric has a brilliant white appearance.

EXAMPLE 24

To 100 ml. of water are added 0.2 ml. of sulphosuccinic acid dioctyl ester. In addition, a 10% sand milling is prepared of the v-triazole of Example 1.1 or 2.1. 3 g. of such a sand milling are added to the above described aqueous solution. With this solution is padded at 20° a polyester fabric (roller pressure 30 kg./cm.², speed 3 m./min.). The still moist fabric is steamed for 30 minutes at 2 atm. The thus treated fabric has a white, brilliant appearance.

If instead of polyester fabric, a polyester/cotton mixed fabric is used, and a sodium chlorite bleaching subsequently carried out, then a brilliantly brightened fabric is obtained.

EXAMPLE 25

To 285 ml. of water are added 0.3 g. of octadecyl alcohol pentadecyl-glycol ether, as well as 0.15 ml. of trichlorobenzene as carrier, and a solution of 0.015 g. of the v-triazole described in Example 1.1 in 15 ml. of ethylene glycol monoethyl ether is added. This aqueous liquor containing the brightener is heated to 20–30° and 15 g. of a polyester fabric are introduced. The temperature is raised within 30 minutes to 130° and the bath is allowed to stand for 1 hour at this temperature. It is then cooled within 15–20 minutes to 60°. The fabric is rinsed and dried. The thus treated fabric possesses a white, brilliant appearance.

EXAMPLE 26

20 g. of a detergent of the composition described in Example 12 are mixed dry with 20 mg. of the v-triazole described in Example 3.1, and 15 mg. of the brightener of the formula

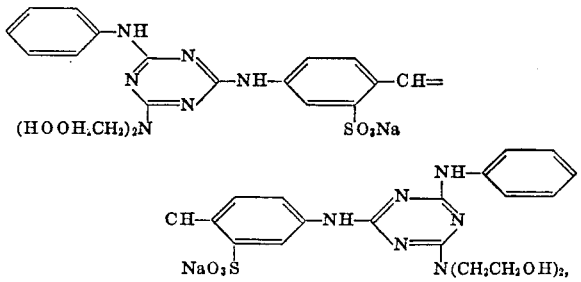

To this mixture are added 20 ml. of water and stirring continues until a homogeneous paste is obtained. This paste is dried in a vacuum drying cupboard. The dried paste is subsequently pulverised. In an amount of 1–5 g./l., it can be used for the brightening of a cotton/polyester mixed fabric.

EXAMPLE 27

100 parts of polypropylene with 0.5 parts of titanium dioxide and 0.05 parts of the optical brightener according to Example 3.1 are homogenised at 20° in a kneading machine. At a temperature of 280–300° and under inert gas at 2–3 atm., the melt is spun, according to known methods, through spinning nozzles. The thus obtained polypropylene threads are distinguished by a high degree of whiteness.

EXAMPLE 28

1000 parts of a polyester granulate made from polyterephthalic acid ethylene glycol are intimately mixed with 0.25 parts of the optical brightener as described in Example 2.1, and the mixture is then spun under nitrogen, from an extruder, at a temperature of 265–285°, in a known manner, through a spinning nozzle to form threads. The thus obtained polyester threads have a clearly whiter appearance than corresponding polyester threads produced without addition of this brightening agent.

Also the brighteners described in Examples 1.1, 3.1, 3.2, 3.3, 3.4 and 3.5 can be used with a high degree of success.

EXAMPLE 29

In a high-grade alloy steel autoclave provided with a stirrer, a gas-inlet tube, a vacuum arrangement, a descending condenser and a heating jacket, 388 g. of benzene-1,4-dicarboxylic acid dimethyl ester, 300 g. of 1,2-ethanediol and 0.4 g. of antimonous oxide are heated, whilst pure nitrogen is being blown through, to 200° external temperature, and held at this temperature for 3 hours, whereby methanol slowly distills off. With the exclusion of air, 0.4 g. of the optical brightener according to Example 2.1, dissolved in 40 g. of 1,2-ethanediol, are carefully fed into the autoclave, after the temperature has been allowed to fall to 190°. After the addition is completed, the temperature is raised within one hour to 285° external temperature, whereby 1,2-ethanediol distills off. The autoclave is then put under vacuum, the pressure slowly reduced to 0.2 torr, and the condensation completed during 3 hours under these conditions. Thorough stirring is maintained during these operations. The liquid condensation polymer is then extruded with nitrogen through the nozzle in the base. From the thus obtained polymers, monofilaments can be produced which have a brilliant white appearance.

It is also possible to use, with a good degree of success, the brighteners described in the Examples 1.1, 3.1, 3.3, 3.4 and 3.5.

Patent claims:

1. Process for the production of halogen-containing v-triazole compound of formula I

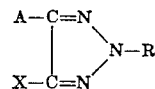

wherein R is phenyl, phenyl substituted by alkoxy having 1 to 4 carbon atoms or alkyl having 1 to 4 carbon atoms or halogen, naphthyl, coumarinyl, a coumarinyl radical of the formula

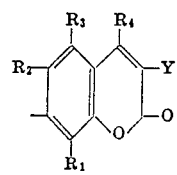

wherein Y stands for phenyl or phenyl substituted by methyl, methoxy or chlorine and $R_1$, $R_2$, $R_3$ and $R_4$ stand for hydrogen or a lower alkyl group, or R is a stilbyl radical of the formula

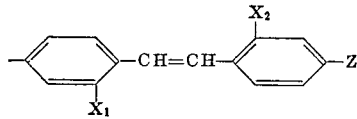

wherein $X_1$ and $X_2$ stand for hydrogen, the sulphonic acid radical, the carboxylic acid radical, the unsubstituted sulphonamide radical, a sulphonamide radical substituted by alkyl having 1 to 4 carbon atoms, an aromatic sulpho ester radical having 6 to 8 carbon atoms, the unsubstituted carbamide radical, a carbamide radical substituted by alkyl having 1 to 4 carbon atoms, carboalkoxy having 2 to 5 carbon atoms, carbophenoxy, an alkylsulphonyl radical having 1 to 4 carbon atoms, the phenylsulphonyl radical or the cyano group and Z stands for hydrogen, halogen, the cyano group, an acylated amino group or a v-triazolyl group, pyrazolyl group or triazinyl group substituted by A; A is alkyl having 1 to 4 carbon atoms, alkenyl having 2 to 4 carbon atoms, benzyl, phenethyl, phenylethenyl, phenylpropenyl, unsubstituted phenyl, a phenyl substituted by alkoxy having 1 to 4 carbon atoms, halogen, and/or alkyl having 1 to 4 carbon atoms; naphthyl or thienyl, and X is chlorine or bromine, characterized in that a v-triazole oxide of formula II

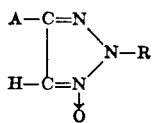

is reacted in a mixture of a water-soluble organic solvent and water at a temperature of 80 to 120° C. with hydrogen chloride or hydrogen bromide.

2. Process according to claim 1 wherein R is a stilbyl radical of the formula

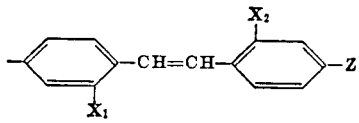

wherein $X_1$ and $X_2$ stand for hydrogen, the sulphonic acid radical, the carboxylic acid radical, the unsubstituted sulphonamide radical, a sulphonamide radical substituted by alkyl having 1 to 4 carbon atoms, an aromatic sulpho ester radical having 6 to 8 carbon atoms, the unsubstituted carbamide radical, a carbamide radical substituted by alkyl having 1 to 4 carbon atoms, carboalkoxy having 2 to 5 carbon atoms, carbophenoxy, an alkylsulphonyl radical having 1 to 4 carbon atoms, the phenylsulphonyl radical or the cyano group and Z stands for hydrogen, halogen, the cyano group, an acylated amino group or a v-triazolyl group, pyrazolyl group or triazinyl group substituted by A.

3. Process according to claim 2 wherein $X_1$ and $X_2$ represent hydrogen or the sulfonic acid radical and Z represents:

4. Process according to claim 1, characterised in that gaseous hydrogen chloride is used for the reaction.

References Cited

UNITED STATES PATENTS

| | | | |
|---|---|---|---|
| 3,453,268 | 7/1969 | Dorlars et al. | 260—240 C |
| 3,666,758 | 5/1972 | Dorlars et al. | 260—240 CX |
| 3,708,475 | 1/1973 | Kirchmayr | 260—240 C |
| 3,459,744 | 8/1969 | Dorlars et al. | 260—240 CA |

OTHER REFERENCES

Elderfield, Heterocyclic Compounds, Vol. 7, frontispiece and pp. 412-3, John Wiley and Sons, Inc., New York (1961).

Begtrup et al., Acta. Chem. Scand., vol. 23, pp. 1091 and 1096 (Sept. 2, 1969).

JOHN D. RANDOLPH, Primary Examiner

U.S. Cl. X.R.

106—163 R, 176; 117—33.5 R, 33.5 T; 252—98, 301.2 W, 543; 260—37 NP, 37 P, 40 P, 75 N, 78 R, 240 CA, 308 A